J. E. ROTHWELL.
AGITATING AND SETTLING TANK.
APPLICATION FILED APR. 11, 1914. RENEWED SEPT. 10, 1915.
1,179,658.
Patented Apr. 18, 1916.
2 SHEETS—SHEET 2.
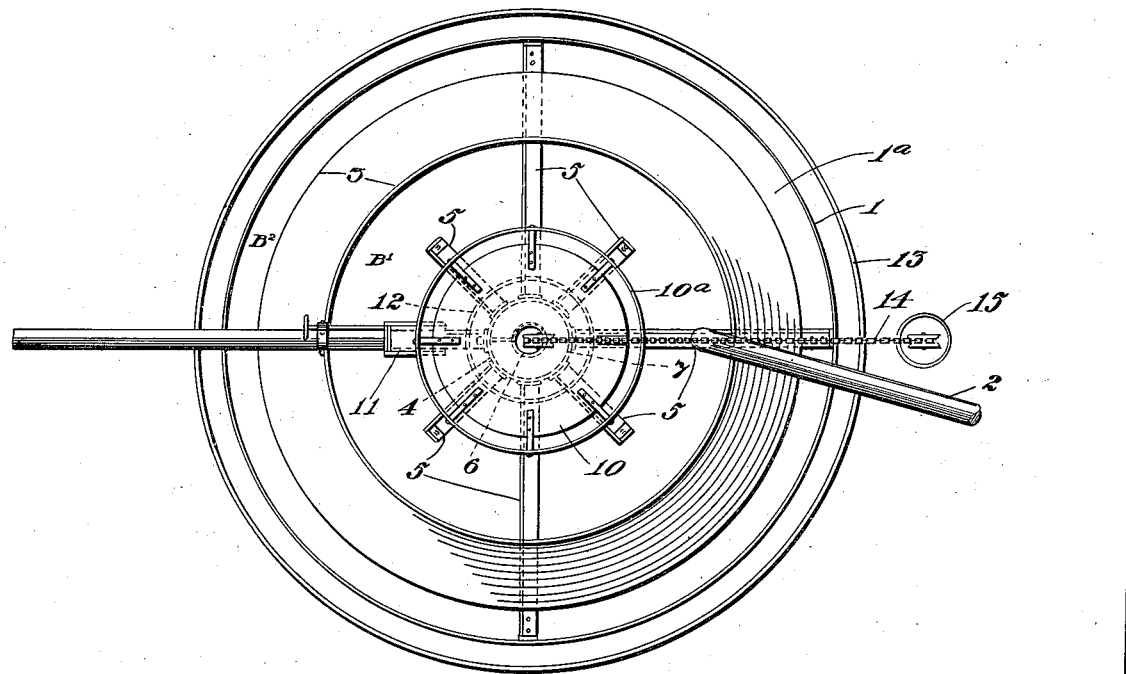
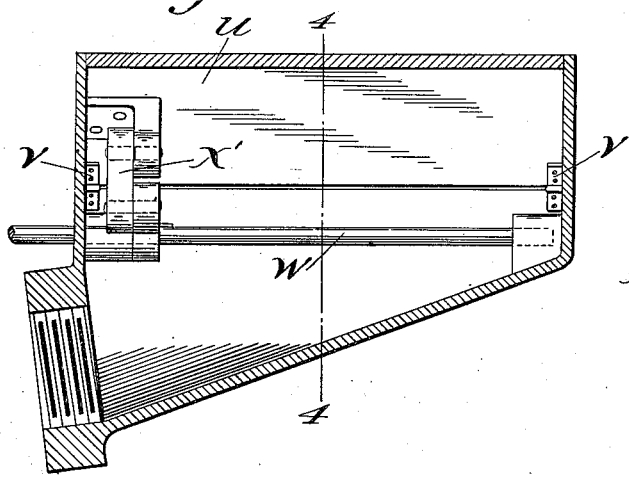
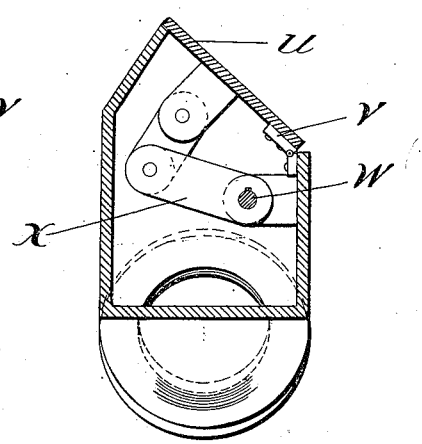
Attest:
E. M. Hamilton.
Ed. L. Tolson.
Inventor:
John E. Rothwell.
by Shan Middleton Donaldson Spear
Attys.

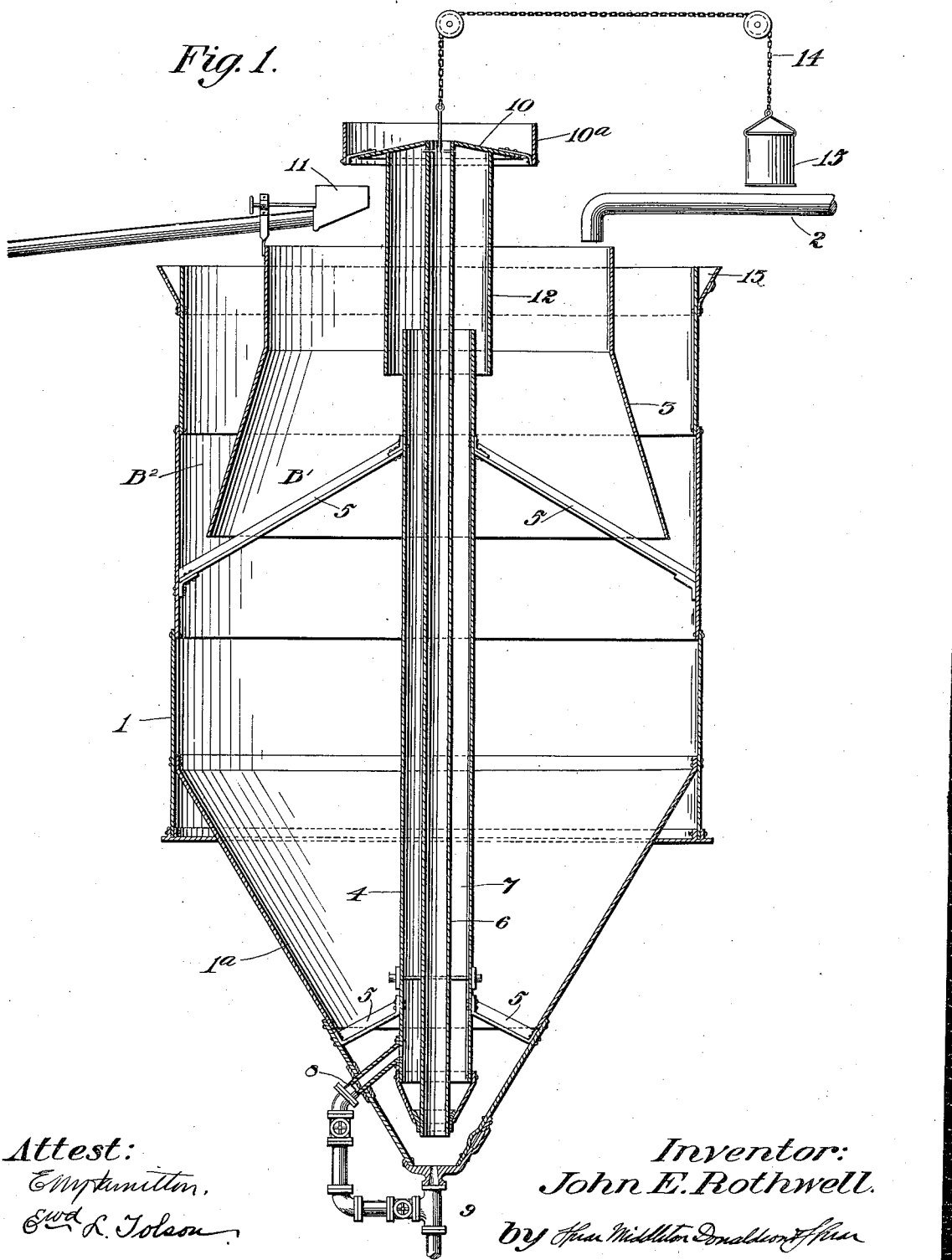

UNITED STATES PATENT OFFICE.

JOHN E. ROTHWELL, OF BUTTE, MONTANA, ASSIGNOR TO COLORADO IRON WORKS COMPANY, OF DENVER, COLORADO, A CORPORATION OF MAINE.

AGITATING AND SETTLING TANK.

1,179,658.  Specification of Letters Patent.  Patented Apr. 18, 1916.

Application filed April 11, 1914, Serial No. 831,298. Renewed September 10, 1915. Serial No. 50,107.

*To all whom it may concern:*

Be it known that I, JOHN E. ROTHWELL, a subject of the King of Great Britain, residing at Butte, Montana, have invented certain new and useful Improvements in Agitating and Settling Tanks, of which the following is a specification.

My present invention relates to improvements in agitating tanks used in the leaching of ores and other products, and has among others for its objects to provide a simple, economical and efficient form of apparatus to which pulp is delivered to be agitated, and which is provided with an overflow for the clear liquor, means such as an annular partition being provided which divides the tank into a settling portion or space, and an agitating portion or space.

The invention includes the novel construction hereinafter described and particularly defined by the appended claims.

In the accompanying drawing, Figure 1 shows a central vertical section through an agitating and settling tank embodying my invention; Fig. 2 is a plan view; Fig. 3 is a sectional detail of the sampling vane; Fig. 4 is a section on line 4—4 of Fig. 3.

Referring by reference characters to these drawings, the numeral 1 designates a tank, preferably circular, to which the pulp is supplied by a pipe 2 leading from any suitable source (not shown). The lower portion or bottom of the tank is preferably of conical form, as indicated at 1$^a$. Within the upper portion of the tank is located an annular partition or skirt 3 which flares outwardly and downwardly, so as to be larger at the bottom than at the top, and this partition divides the upper portion of the tank into two spaces, an inner agitating space B′ and an outer annular quiet settling space B$^2$. The supply of pulp to the tank or vessel is through the agitating space B′, as shown in the drawing. Within the tank and extending from a point near the bottom upward to near the upper end thereof is a cylindrical pipe 4 supported from the walls of the tank by braces, as indicated at 5, and within this cylindrical pipe or casing is an inner pipe or tube 6. This inner pipe 6 is open at the bottom, but the annular space 7 formed between the pipes 6 and 4 is closed at the bottom, and this annular space communicates by a valve pipe 8 with suitable elevating means such, for instance, as an air lift indicated at 9. By means of this pipe 8 and the air lift 9 the material is drawn from the lower portion of the annular chamber 7 formed by pipes 6 and 4, and caused to flow upwardly through the pipe 6, carrying with it the material which has settled in the lower portion of the cone-shaped bottom of the tank 1$^a$. It will be understood that the air lift is shown as representative of any suitable means for withdrawing the material from said annular space and forcing it up through the central pipe to carry up the settled material. The pipe 6 communicates at its upper end with a distributing plate or cone 10 which is surrounded by an annular flange 10$^a$.

At 11 is indicated the adjustable cutting or sampling vane or box by means of which a proportional quantity of the material may be conducted away from the tank. This is placed beneath the opening between 10 and 10$^a$, so that it catches a part of the material flowing down over the spreader 10, which can be passed to a following tank. There is a peculiar advantage in this manner of withdrawing the pulp. Heretofore, as far as I am aware, it has been withdrawn from a point below the level of the tank contents, and when this is done there is always a tendency for an excessive amount of very fine material to be withdrawn while a less proportion of coarse material accompanies it. As all the material circulates up through the pipe 6, the sampling vane 11 must take a true sample without favoring either coarse or fine, and this will avoid the accumulation of the coarsest of the sands in the tank. The purpose of part 10$^a$ is to prevent the material coming up through pipe 6 from splashing out so far as to make the operation of the sampling vane unreliable. The sampling vane or box is provided with a cover U hinged at V.

W is the shaft to which the hand wheel W′ is fixed, and the lever X is also fastened to this shaft and connected by link X′ to a lug on the cover. Turning the hand wheel therefore raises the cover and permits the variation of the width of the slit in the top of the box.

Depending from the plate or cone 10 is a cylinder or skirt 12 of a larger diameter than the cylinder or pipe 4, and depending slightly below the upper end thereof, as shown, this allowing a portion of the material within the flaring skirt or partition to pass upward between pipes 12 and 4, and downward between pipes 4 and 6.

The tank 1 is surrounded at its upper edge with an overflow launder, as indicated at 13.

The pipe or tube 6 is adjustably supported by means such as a flexible element 14 passing over pulleys and provided with counterweight 15.

Having thus described my invention what I claim is:

1. An apparatus of the class described comprising a tank, means for maintaining agitation therein, means for simultaneously withdrawing clear liquid therefrom and means above the normal level of the contents of the tank for withdrawing a portion of the material circulated through the agitation means.

2. An apparatus of the class described comprising a tank, means for maintaining agitation therein, means for simultaneously withdrawing clear liquid therefrom and adjustable means above the normal level of the contents of the tank for withdrawing a portion of the material circulated through the agitation means.

In testimony whereof, I affix my signature in presence of two witnesses.

JOHN E. ROTHWELL.

Witnesses:
 EDWIN P. SINTER,
 BRIGGS R. KINNEY.